Feb. 10, 1970   P. S. MYERS ET AL   3,494,336
METHOD AND APPARATUS FOR REDUCING EXHAUST EMISSIONS
AND IMPROVING FUEL UTILIZATION IN INTERNAL
COMBUSTION ENGINES
Filed Feb. 10, 1967   10 Sheets-Sheet 1

INVENTORS
PHILLIP S. MYERS
OTTO A. UYEHARA
BY Joseph G. Werner
John M. Winter
ATTORNEYS

INVENTORS
PHILLIP S. MYERS
OTTO A. UYEHARA

INVENTORS
PHILLIP S. MYERS
OTTO A. UYEHARA
BY
ATTORNEYS

Feb. 10, 1970 P. S. MYERS ET AL 3,494,336
METHOD AND APPARATUS FOR REDUCING EXHAUST EMISSIONS
AND IMPROVING FUEL UTILIZATION IN INTERNAL
COMBUSTION ENGINES
Filed Feb. 10, 1967 10 Sheets-Sheet 7

INVENTORS
PHILLIP S. MYERS
OTTO A. UYEHARA
BY
ATTORNEYS

United States Patent Office

3,494,336
Patented Feb. 10, 1970

3,494,336
METHOD AND APPARATUS FOR REDUCING EXHAUST EMISSIONS AND IMPROVING FUEL UTILIZATION IN INTERNAL COMBUSTION ENGINES
Phillip S. Myers, 3210 Oxford Drive 53704, and Otto A. Uyehara, 1610 Waunona Way 53713, both of Madison, Wis.
Filed Feb. 10, 1967, Ser. No. 615,145
Int. Cl. F02b 47/08
U.S. Cl. 123—75                                  4 Claims

ABSTRACT OF THE DISCLOSURE

A method and apparatus for providing a stratified charge of exhaust gases and air-fuel mixture in the combustion chamber of an internal combustion engine when the engine is operating at less than full load. The relative amounts of the two constituents making up the stratified charge are varied in response to accelerator position by variable timing control mechanism, with maximum air-fuel mixture supply and minimum retention of exhaust gases for stratification taking place at full load.

BACKGROUND OF THE INVENTION

Field of the invention

Our invention relates to internal combustion engines and more specifically to a method and apparatus for reducing undesirable smog-producing exhaust emissions from internal combustion engines and for improving the fuel utilization of such engines, particularly when they are operated at less than full load.

Description of the prior art

Ordinarily, in piston-type internal combustion engines the piston displacement is purposely chosen to provide the maximum required power. Operation of such engines at a lower output is achieved either by reducing the mass of air-fuel mixture admitted to the engine (called quantity-governing or throttling as used in conventional, spark-ignited, carbureted engines) or by reducing the amount of fuel introduced without significantly changing the accompanying weight of air introduced (called quality-governing as used in conventional, compression-ignition engines or diesel engines).

Better fuel utilization may be obtained with quality-governing, where it is possible to maintain a stratified charge of air-fuel mixture and air, as in the case of compression-ignition engines. However, in spark-ignition, carbureted engines operating at less than full load, a reduction of the fuel alone (quality-governing) would result in an increasingly lean homogeneous combustion mixture; that is, the ratio of the weight of fuel to the weight of air in the mixture would be substantially decreased. Since flame speed decreases rapidly as the mixture becomes more lean, a point is reached where slow burning more than offsets any advantages gained by controlling the cobustion mixture composition. Ideally, the air-fuel mixture should be maintained at about ten to about eighteen parts of air by weight to one part of fuel over all ranges of load. Optimum conditions of combustibility, flame propagation and mean effective pressures are realized within this mixture range. Because it has not previously been possible to maintain the composition of the combustion mixture within this range over all ranges of engine load in conventional, spark-ignition, carbureted engines with quality-governing, the less economical method of quantity-governing is used to regulate power output in such engines.

Quantity-governing leaves much to be desired however, since in all practical reciprocating engines there is a "clearance volume" between the head and the piston when the piston is at the end of its exhaust stroke, and therefore, a portion of the products of combustion remains in this clearance volume after each exhaust stroke and is mixed reasonably well with the incoming air-fuel mixture during the next intake stroke to form a relatively homogeneous diluted combusion-mixture. Because a substantially uniform volume of clearance gases remains in the cylinder after each exhaust stroke regardless of engine load, decreasing the amount of air-fuel mixture at partial engine loads results in greater dilution of the air-fuel mixture. At very light loads, such as when decelerating, the resulting diluted mixture is frequently below the combustible range and combustion may then be undesirably slow and incomplete or fail altogether. Failure of the spark to ignite the diluted combustion mixture or the failure of the flame to only partially penetrate the diluted mixture causes the smog-producing exhaust emissions of partilly burned and unburned fuel and oxides of nitrogen to be increased beyond what is now a tolerable limit, particularly, in large urbanized areas where there is a heavy concentration of motor vehicle traffic.

Another problem with conventional quantity-governing in reciprocating engines is that it reduces the resulting pressure in the combustion chamber during the intake stroke which reduces the net power output of the engine available for useful work.

It is well known that in spark-ignition engines, the flame originates at the spark plug and spreads outwardly toward the combustion chamber walls, i.e., the head, the valves, the piston, and the cylinder wall. At the completion of burning there is a generally cylindrical "quench zone" adjacent the walls of the combustion chamber where, because of the cooling effect of the combustion chamber walls, the flame is unable to propogate any further. As a result, the gases in this quench zone contain a very high concentration of unburned and partially burned fuel and oxides of nitrogen and when exhausted, cause substantial pollution of the atmosphere. Because of the generally cylindrical configuration of the quench zone, the gases initially expelled from the cylinder during the exhaust stroke and those which are expelled toward the end of the stroke have the largest concentration of unburned and partially burned fuel.

A further problem which is common in conventional quantity-governed, spark-ignition engines is that, as the amount of air-fuel mixture is decreased, the temperature within the combustion chamber drops sharply during the expansion stroke. Oxides of nitrogen, formed during the high temperatures of the initial combustion and which theoretically if in equilibrium should be reduced by the lower temperatures during expansion are not, as a practical matter, substantially reduced because of the speed of the temperature drop and are therefore exhausted into the atmosphere adding greatly to the pollution problem. The problem is even more pronounced at moderate engine loads where greater amounts of nitrogen oxide are producd because of the increased oxygen associated with the combustion of the leaner mixtures present. On the other hand, rich air-fuel mixtures result in increased production of deadly carbon monoxide gas and even more unburned fuel which are formed as a result of a deficiency of oxygen in the cylinder.

An additional problem which is common to spark-ignition, carbureted engines, is that of vaporization of fuel in the intake manifold caused by fluctuating pressures therein. The pressure in the intake manifold decreases as the engine load decreases and increases as the engine load increases. It is well known that the fuel in the intake manifold and intake port is not completely vaporized, that a film of fuel builds up on the walls of the intake manifold and port, and that the thickness of this fuel film increases as the manifold pressure increases. As a result, sudden load increases cause a corresponding increase in manifold pressure and consequently, a thicker film of fuel. It is therefore necessary to momentarily supply fuel in excess of what should be necessary for the particular load requirements in order to compensate for the increased amount of fuel temporarily deposited on the manifold wall. This excess fuel deposited on the walls of the intake manifold will ultimately reach the combustion chamber when the engine load decreases resulting in a decrease in pressure in the intake manifold and, thus, causing an overly rich mixture resulting in incomplete combustion and carbon monoxide emissions because of a lack of oxygen in the combustion chamber.

It is known that in present quantity-governed, spark-ignited engines the cycles are not precisely repetitive with the peak pressure in the combustion chamber varying by as much as 100 p.s.i. from cycle to cycle under some conditions. One of the explanations for this cycle-to-cycle variation is that in one cycle products of combustion remaining from the previous cycle (clearance gases) and in part diluted by the incoming fresh air-fuel mixture may be between and around the electrodes of the spark plug when spark occurs, while during the next cycle only fresh air-fuel mixture may be present at the electrodes. Because of this varying composition of the gases around the electrode, the early growth of the flame differs from cycle to cycle with resulting pressure variations and poor fuel utilization.

The exhaust emission and fuel utilization problems noted above are particularly pertinent in regard to motor vehicles because of the vast number of such vehicles now being operated on our nation's highways and because of the fact that such vehicles are most frequently operated at something less than full load.

It has long been known that the diffusion of one gas through another is a very slow process in the absence of turbulence and mixing. Thus, if two gases are separately introduced into an enclosed container, in the absence of deliberate mixing or turbulence the gases will remain substantially stratified for a long period of time. This condition can occur and persist to a large extent even when the gases are rapidly introduced and compressed as they are in the combustion chamber of an internal combustion engines since the time for mixing is reduced accordingly.

This phenomenon has led to early attempts to stratify an air-fuel mixture with air as a means of economizing fuel at partial engine loads. (See U.S. patent—Greuter 838,399 issued 1906.) While this approach represented significant improvement in engine operation at the time, it does not make beneficial use of the unburned constituents in the combustion gases. It neither permits or requires that the products of combustion remain in the cylinder for the next cycle so that the continuing and repeated high temperatures and pressures to which these products of combustion are subjected can complete the combustion of the unburned or partially burned fuel for obtaining additional power and reducing exhaust emissions.

More recently, public opinion and ordinances in various urban areas have prompted research and developments in the field of exhaust gas treatment. Developments in this field include the use of catalytic mufflers, the re-circulation of exhaust gases to the intake manifold where a relatively homogeneous mixture of exhaust gases and fresh air-fuel mixtures are formed, the addition of air to the exhaust manifold, and modifications in carburetion and spark timing aimed at reducing exhaust emissions.

The presently known methods have proven to be only partially successful in reducing undesirable exhaust emissions while maintaining maximum fuel economy and have generally been commercially impractical.

SUMMARY OF THE INVENTION

We have invented a practical method, and apparatus for effectively applying our method to a variety of well-known types of internal combustion engines, for reducing undesirable exhaust emissions while maintaining maximum fuel economy at all ranges of engine load by making maximum use of partially burned and unburned fuel constituents in the exhaust gases. Basically, our invention consists of a method and apparatus for stratifying a portion of the exhaust gases produced in one cycle with air-fuel mixture in the combustion chamber of an internal combustion engine during the following cycle or cycles when the engine is operating at less than full load whereby there is substantially no dilution of the optimum composition of the air-fuel mixture. The relative amounts of the two constituents making up the combustion chamber charge are varied to meet the varying power demands on the engine, with minimum retention of exhaust gases for stratification taking place at full load. The portion of the exhaust gases selected for stratification with the air-fuel mixure during the succeeding cycle is that having a relatively high concentration of unburned or partially burned fuel and oxides of nitrogen so that recompression and continued burning of these gases result in further useful power release and reduction of unburned fuel and oxides of nitrogen.

In view of the shortcomings of known methods and apparatus as noted in the foregoing "Description of the prior art," the objects of our invention are as follows:

To provide a method and apparatus for internal combustion engines for producing a stratified charge of fresh air-fuel mixture and combustion gases and igniting the air-fuel mixture thereby obtaining additional power and "cleaner" exhaust gases by the recompression, oxidation, and expansion of the unburned and partially burned fuel and oxides of nitrogen in the combustion gases in the combustion chamber.

To provide a method and apparatus for internal combustion engines wherein there is substantially no dilution of the optimum composition of the air-fuel mixture when the engine is operating at varying load capacities.

To provide a method and apparatus for internal combustion engines for maintaining substantially uniform pressures in the combustion chamber during intake.

To provide a method and apparatus for internal combustion engines wherein the portion of the exhaust gases utilized to produce a stratified combustion chamber charge is obtained from the "quench zone" having a high density of unburned hydrocarbons and wherein air may be added to the retained exhaust gases to facilitate further reduction in the combustion chamber of the unburned and partially burned hydrocarbon constituents therein.

To provide a method and apparatus for internal combustion engines wherein as the engine load is reduced the size of the "quench zone" is reduced accordingly resulting in a decrease in unburned and partially burned hydrocarbon exhaust emissions at partial engine loads.

To provide a method and apparatus for internal combustion engines wherein the supply of air-fuel mixture may be completely cut off during deceleration resulting in elimination of exhaust emissions during deceleration.

To provide a method and apparatus for maintaining the exhaust gases utilized to stratify the combustion chamber charge at relatively high temperatures, preferably in the presence of additional air, thereby providing optimum conditions for completion of combustion to minimize the expulsion of nitrogen oxide, carbon monoxide and unburned fuel.

To provde a method and apparatus for internal combustion engines for obtaining substantially uniform pressure in the intake manifold at all ranges of engine load to reduce exhaust emissions and improve fuel utilization.

To provide a method and apparatus for internal combustion engines which consistently produce a substantially undiluted fresh air-fuel mixture at the electrodes of the spark plug for ignition thus resulting in good cycle-to-cycle reproducibility for improved fuel utilization.

Other objects, features and advantages of our nvention will be apparent from the following detailed description taken in conjunction with the accompanying drawings, wherein several embodiments of the principles of our invention applied to several well-known types of internal combustion engines have been selected for exemplification.

BRIEF DESCRIPTION OF THE DRAWINGS

The drawings are somewhat simplified to illustrate the theory and functioning of our invention and are not intended to depict all of the combponents of the various internal combustion engines. Only those parts which are necessary for understanding of our invention have been included.

FIGS. 17–20 are schematic sectional views showing the sequential peration of the two-stroke cycle engine shown in FIG. 14.

FIGS. 17–20 are schematic sectional views showing the sequential operation of the two-stroke cycle engine shown in FIG. 14.

DESCRIPTION OF THE PREFERRED EMBODIMENTS

(a) Four-stroke cycle engine

Our method and apparatus as embodied in a four-stroke cycle, reciprocating piston, internal combustion engine is illustrated in FIGS. 1–8. Each cylinder 20 has a cylinder wall 21, a split head 22 having top and bottom portions 22a and 22b, respectively, a reciprocal piston 23, an intake manifold 24, an intake port 25 in the cylinder head, an exhaust manifold 26, an exhaust port 27 in the cylinder head, and a spark plug 28.

As shown in FIGS. 1–5, the intake and exhaust functions are controlled by an intake valve assembly 30 and an exhaust valve assembly 40. Intake valve assembly 30 comprises a main intake valve 31 and an auxiliary intake timing valve 32 positioned in series therewith in the intake port 24, while exhaust valve assembly 40 has a main exhaust valve 41 and an auxiliary exhaust timing valve 42 positioned in series therewith in the exhaust port 27.

The main intake valve 31 has a stem portion 33 and a circular head 34 having a circumferential bevelled sealing surface 34a adapted to seal against frusto-conical valve seat 35 formed in the lower portion 22b of heat 22. The auxiliary intake timing valve 32 has a tubular stem portion 36 and a circular head 37. The stem portion 33 of the main intake valve 31 is slidably received in and extends through the tubular stem portion 36 and head 37 of auxiliary valve 32. An annular recess 38 is formed in the intake port 25 to provide a passage around auxiliary valve head 37 for drawing in the air-fuel mixture during the intake stroke. Additionally, the bottom of the recess 38 provides an annular valve seat 39 for auxiliary valve head 37. The cylinder head 22 is split to permit insertion of the valve assemblies.

As will be described further hereinafter, the auxiliary timing valves such as 32 perform a secondary closing function and are not subjected to the high cylinder pressures. Therefore, they may be of substantially lighter construction than the main valves, and the resulting seals need not be maintained with such close tolerances.

Figure 6:
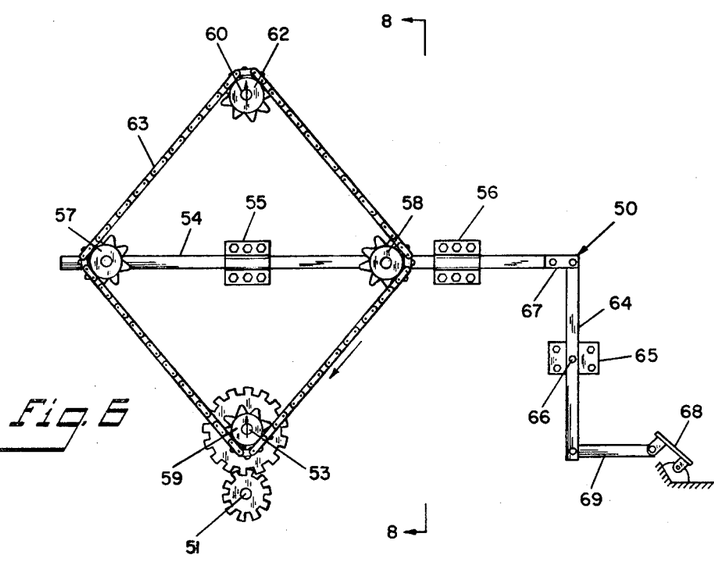
FIG. 6 is a schematic drawing in side elevation of valve phase control mechanism in operative position at full engine load.
Figure 7:
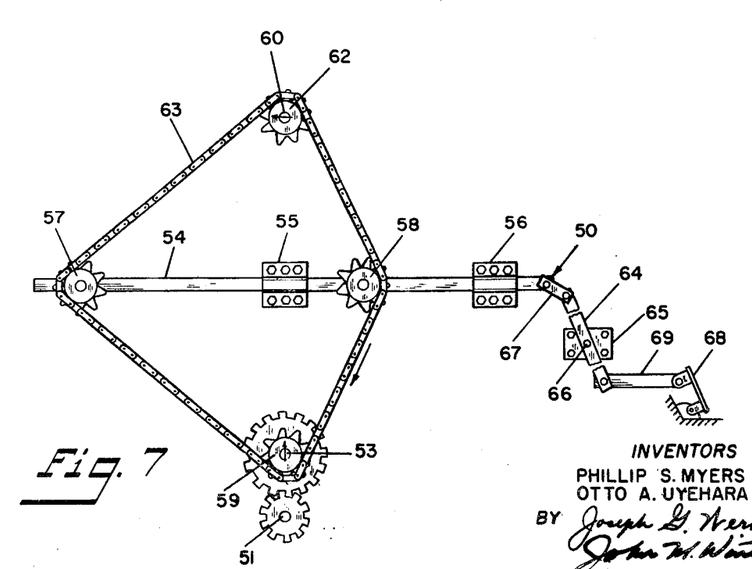
FIG. 7 is a schematic drawing in side elevation of valve phase control mechanism when the engine is operating at less than full load.
Figure 8:
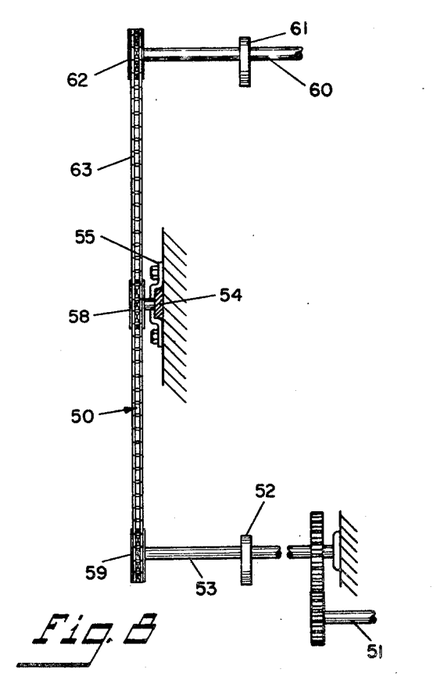
FIG. 8 is a sectional view taken along line 8—8 of FIG. 6.

The two valves 31 and 32 forming the intake valve assembly 30 may be actuated independently of each other by control means 50 shown in FIGS. 6–8. The main intake valve 31 may be actuated in the conventional manner, i.e., in response to the rotational position of cam 52 on camshaft 53 which is driven directly from the crankshaft 51 of the engine at one-half the speed of the crankshaft. The auxiliary intake valve 32 is actuated in response to accelerator position by variable timing control mechanism.

The variable timing control mechanism has a slide bar 54 mounted for reciprocal movement in a pair of stationary slide brackets 55 and 56. The slide bar carries a pair of idler sprockets 57 and 58. A drive sprocket 59 is mounted on camshaft 53 for rotation therewith. A second camshaft 60 having a cam 61 for actuating the auxiliary intake timing valve 32, also has a sprocket 62 mounted thereon for rotation therewith. The second camshaft 60 is driven by a drive chain 63 trained over sprockets 57, 58, 59, and 62. A pivot lever 64 is pivotably mounted on a stationary bracket 65 by pin 66 and is attached to one end of slide bar 54 by linkage member 67 and to accelerator pedal 68 by linkage member 69.

From FIGS. 6–8 it will be seen that camshaft 53 is driven by and bears a fixed rotational relationship to the crankshaft 51 of the engine and, thus, its operation is related to piston position. The cam 52 on camshaft 53 actuates the stem portiton 33 of the main intake valve 31. Camshaft 60, on the other hand, bears a variable rotational relationship to the engine crankshaft 51 and to camshaft 53. This variable rotational relationship is determined by the position of slide bar 54 which, in turn, is controlled by the positioning of the accelerator pedal 68. This variable relationship can be most readily visualized by considering camshaft 53 to be fixed in FIG. 6 (not rotating) and then moving slide bar 54 to the left as in FIG. 7 which will decrease the distance between sprockets 58 and 59 and between sprockets 58 and 60, and will increase the distance between sprockets 57 and 59 and between sprockets 57 and 62, whereby the resulting adjustment of chain 63 will cause camshaft 60 to be rotated out of phase in a counter-clockwise direction with respect to camshaft 53. Thus, it is also readily apparent that the rotational relationship of camshaft 60 is variable with respect to crankshaft 51 and that the phase relation therebetween is determined by accelerator position, while on the other hand, camshaft 53 has a fixed rotational relation with respect to crankshaft 51.

FIG. 6 shows the variable timing control mechanism in the operating position it would assume when the engine is operating at full load. As indicated by the phase control arrows on sprockets 59 and 62, at full engine load the camshafts 53 and 60 are rotating in phase whereby the main intake valve 31 and the auxiliary intake timing valve 32 are operating in unison. As the pivotal movement of the accelerator 68 decreases the engine load, the accelerator movement is transmitted into lineal movement of slide bar 54 whereby the camshafts 53 and 60 assume an out-of-phase relationship, such as shown in FIG. 7. The new position of the phase indicating arrows on sprockets 59 and 62 shows the "lagging" relationship of camshaft 60 to camshaft 53 whereby the auxiliary intake timing valve 32 is opened later in the engine cycle than the main intake valve 31 when the engine is operating at less than full load.

The exhaust vlave assembly 40 is similar to the intake valve assembly 30. The main exhaust valve 41 has a stem portion 43 and a circular head 44 having a circumferential bevelled sealing surface 44a adapted to seal against frusto-conical valve seat 45 formed in the lower portion 22b of head 22. The auxiliary exhaust timing valve 42 has a tubular stem portion 46 and a circular head 47. The stem portion 43 of the main exhaust valve 41 is slidably received in and extends through the tubular stem portion 46 and head 47 of auxiliary valve 42. An annular recess 48 is formed in the exhaust port 27 to provide a passage around auxiliary valve head 47 for exhaust gases leaving the combustion chamber. Additionally, the bottom of recess 48 provides an annular valve seat 49 for auxiliary valve head 47.

Like valves 31 and 32, the two valves 41 and 42 forming the exhaust valve assembly 40 may be actuated independently of each other by means similar to that shown in FIGS. 6–8 except that the auxiliary exhaust timing valve 42 is actuated to close earlier in the engine cycle than the main exhaust valve 41. This may be accomplished with mechanism like to that shown in FIGS. 6–8 except that either the chain 63 must be traveling in the direction opposite to that shown, or the slide bar must be moved in the opposite direction to that shown when the engine load decreases. In either way, when the engine is operating at less than full load the closing of auxiliary exhaust timing valve 42 will "lead" the closing of main exhaust valve 41 by an amount determined by the engine load through the positioning of the accelerator pedal 68.

An important aspect of our invention is to minimize volume between the auxiliary intake timing valve 32 and the main intake valve 31 in order that the auxiliary valve 32 truly control the first introduction of the airfuel mixture into the chamber, i.e., if the volume between valves 31 and 32, both in the closed position, is large, air-fuel mixture would pass into the cylinder or exhaust gases would pass into the volume between valves 31 and 32 when valve 31 opened. This is undesired since it increases the time for and the possibility of mixing of the air-fuel mixture and the clearance gases. As can be seen in FIGS. 1–5, the volume between the valves when auxiliary intake timing valve 32 is closed and when main intake timing valve 31 is closed is extremely small.

Figure 9:
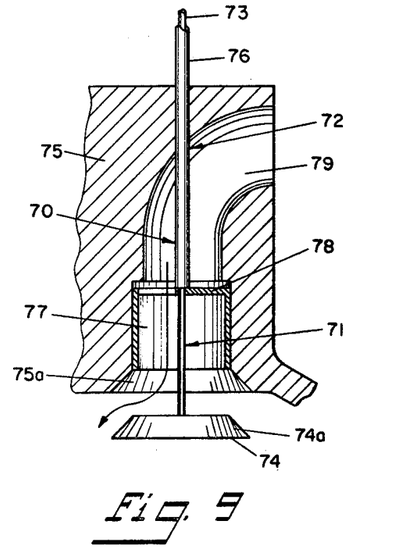
FIG. 9 is a schematic sectional view of a modified valve assembly wherein the port is open.
Figure 10:
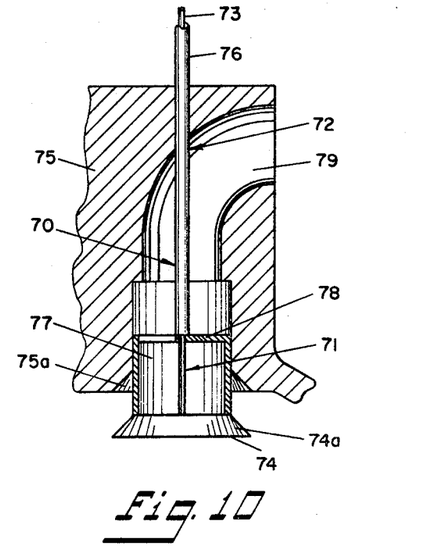
FIG. 10 is a schematic sectional view of the valve assembly of FIG. 9 wherein the port is closed by the auxiliary timing valve.
Figure 11:
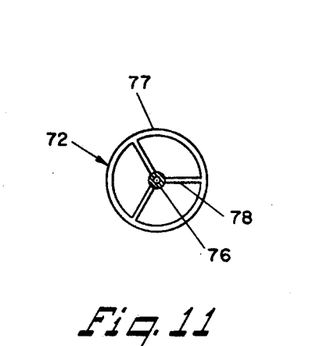
FIG. 11 is a top view of the auxiliary timing valve of FIGS. 9 and 10.

A modified form of valve assembly is shown at 70 in FIGS. 9–11. In this valve assembly there is zero volume between the main valve 71 and the auxiliary timing valve 72 when valve 72 is closed. The main valve 71 has a stem portion 73 and a circular head 74 having a circumferential bevelled sealing surface 74a adapted to seal against frusto-conical valve seat 75a formed in the cylinder head 75. The auxiliary timing valve 72 has a tubular stem portion 76 and a cylindrical head 77. The stem portion 73 of the main valve 71 is slidably received in and extends through the tubular stem portion 76 and head 77 of the auxiliary timing valve 72. The cylindrical walled head 77 is supported from the stem 76 by spokes 78. When the valves 71 and 72 are in their open positions shown in FIG. 9 the flow path (indicated by the arrow) is through the cylindrical head 77. When the auxiliary valve 72 is closed, as shown in FIG. 10, the cylindrical head portion 77 thereof seals against the wall of the port 79 and against the back of the head 74 of the valve 71 to cut off the flow through the port.

The sequential operation of valve assemblies 30 and 40 of a cylinder in a four-stroke cycle engine operating at partial load will now be described in connection with FIGS. 1–5.

Figure 1:
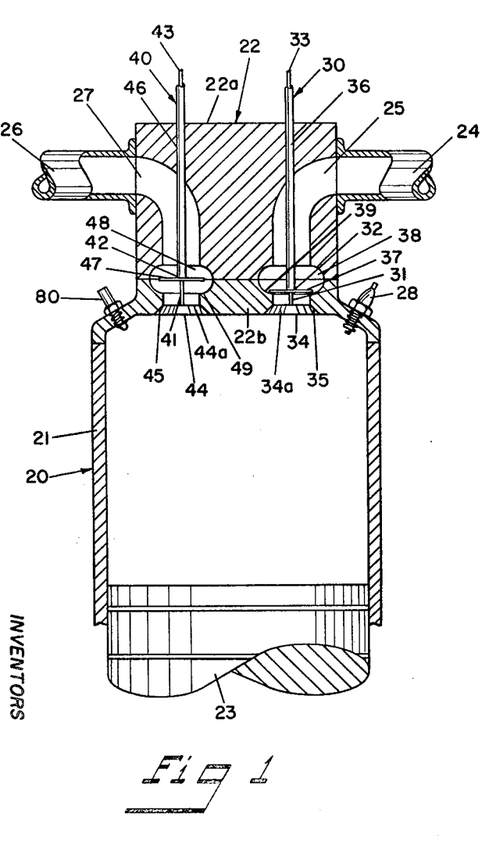
FIGS. 1–5 are schematic sectional views showing the sequential operation of the valve assemblies for a cylinder in a four stroke cycle internal combustion engine illustrating a method and apparatus embodying our invention.
Figure 2:
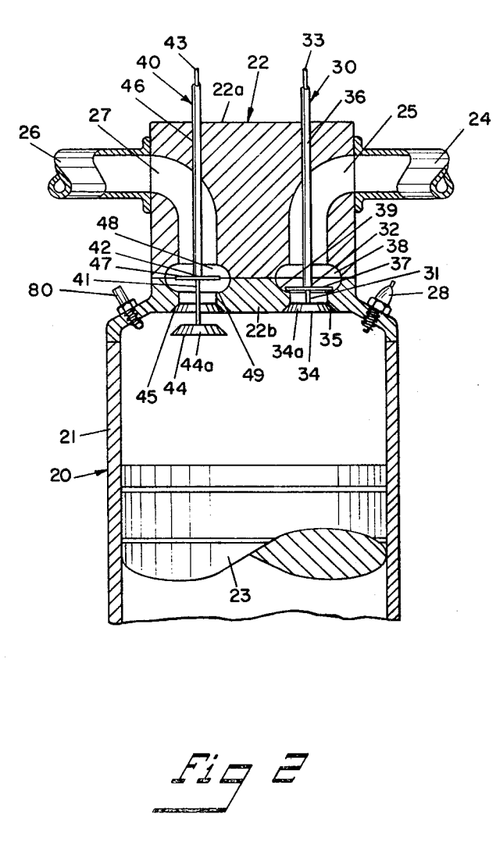
Figure 3:
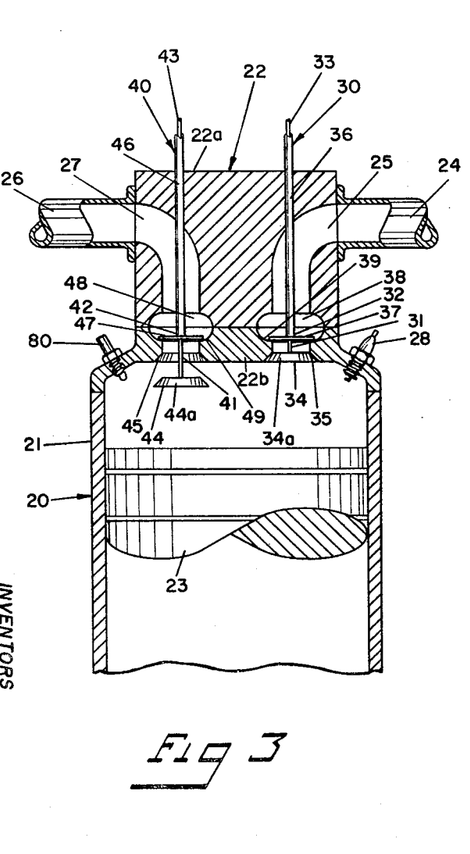

In FIG. 1, the piston 23 is shown at the end of the expansion or power stroke. At this point in the engine cycle, the cylinder 20 is filled with products of combustion. In a conventional four-stroke cycle engine, during the next portion of the engine cycle, namely the exhaust stroke, the products of combustion would be forced from the cylinder during the upward travel of the piston except for a small amount of clearance gases which the piston is unable to scavenge from the clearance volume. These clearance gases which are inadvertently retained are virtually independent of engine load. However, in our novel four-stroke-cycle engine, a stratified charge of products of combustion and air-fuel mixture is desired for partial engine loads and, therefore, a portion of the products of combustion are kept in the cylinder in addition to the clearance gases. The amount of the products of combustion retained depends on the load at which the engine is operating with the amount increasing as the load decreases. During the initial portion of the exhaust stroke, as shown in FIG. 2, both the main exhaust valve 41 and the auxiliary exhaust timing valve 42 are open, however, as shown in FIG. 3, the auxiliary exhaust timing valve 42 closes ahead of main exhaust valve 41 before the completion of the exhaust stroke, thus, trapping a quantity of the products of combustion in the cylinder. The early closing of auxiliary exhaust timing valve 42 at partial engine load is brought about by the control means shown in FIGS. 6–8, wherein the camshaft actuating the auxiliary exhaust valve is rotated out of phase ahead of the camshaft controlling the main exhaust valve as described hereinbefore.

It will be noted that the products of combustion which are trapped in the cylinder, are those in the last portion of the exhaust gases leaving, i.e., those gases from that portion of the "quench zone" adjacent the piston, and are therefore relatively rich in unburned fuel and oxides of nitrogen.

Figure 4:
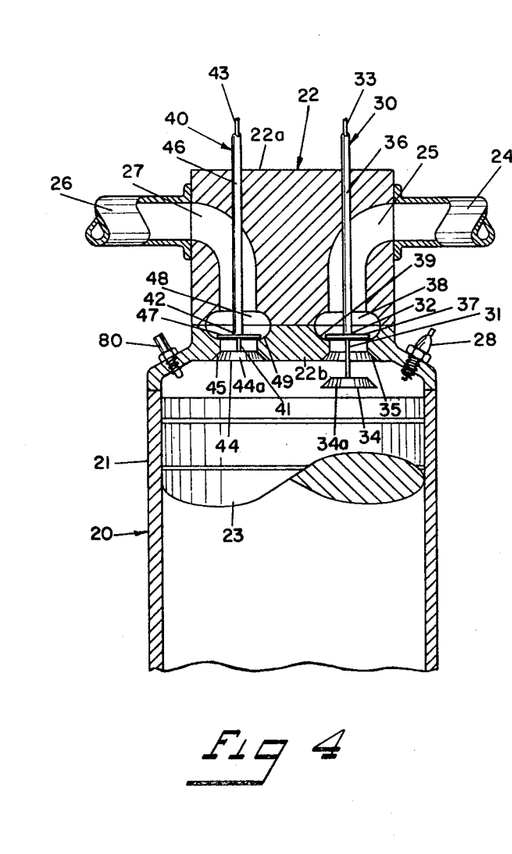
Figure 5:
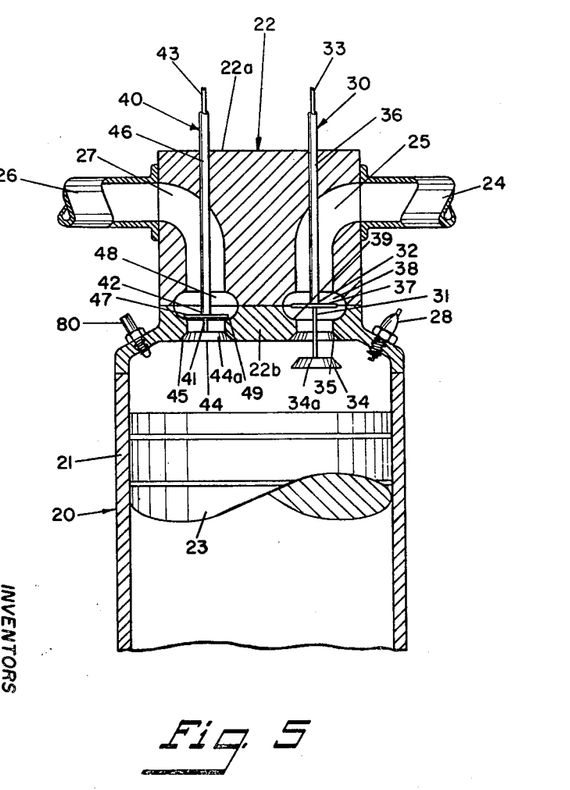

When the piston 23 reaches the top of its stroke as shown in FIG. 4, the main exhaust valve 41 is closed and the main intake valve 31 is opened in the normal manner. The opening of the auxiliary intake timing valve 32, however, is delayed by the control means shown in FIGS. 6–8 until the piston 23 has completed part of its downward intake stroke and the pressure within the cylinder 20 has returned to about atmospheric. At this point of the intake stroke, as shown in FIG. 5, the auxiliary intake timing valve 32 is opened by the camshaft 60 shown in FIG. 7 and the air-fuel mixture is drawn into the cylinder through the intake port 25. The main exhaust valve 41 remains closed for the entire intake stroke and the main intake valve 31 is closed in the normal manner by camshaft 53 at the end of the intake stroke when the piston is at its lower position.

Both main valves 31 and 41 remain closed during the upward compression stroke of the piston 23 and during the downward power stroke of the piston.

Since an object of our invention is to obtain further oxidation reduction of the unburned and partially burned hydrocarbons in the retained products of combustion, additional air may be introduced into the products of combustion retained in the cylinder 20 by an air injector 80 mounted in the lower portion 22b of head 22 as shown in FIGS. 1–5. The additional air may be introduced into the cylinder after the products of combustion have been trapped in the cylinder during the exhaust stroke and before the delayed opening of auxiliary intake valve 32 after which air-fuel mixture would be drawn into the cylinder. The amount of air introduced by the injector may be controlled by the camshaft which actuates the auxiliary exhaust valve 42 in that the amount of air would vary according to the amount of combustion gases retained in the cylinder. It would be possible to introduce the desired additional air into the cylinder any time after the exhaust port 27 is opened by auxiliary exhaust valve 42, however, larger amounts of air would be required since some of the air introduced would escape with the exhausted combustion gases.

It is clear from the foregoing description that in our engine when operating at less than full load, the additional reaction time afforded the retained portion of the hot combustion gases during a second cycle causes the unburned and partially burned hydrocarbons in the combustion gases to be further reduced through oxidation in the combustion chamber whereby undesirable exhaust emissions are reduced and extra power is obtained. This is particularly true when additional air for oxidation is supplied by air injector 80 as just described.

It should also be noted that when no power is needed, as during deceleration, the auxiliary intake valve 32 can be kept closed until the main intake valve 31 is closed whereby there is no admission of air-fuel mixture into the cylinder during deceleration and exhaust emissions are reduced accordingly.

It is important from the standpoint of cycle-to-cycle reproducibility that the stratified charge formed during each cycle have substantially the same composition and that the area adjacent the spark plug contain a relatively pure mixture of air and fuel. It is therefore desirable to scavenge the area near the spark plug of products of combustion with the incoming air-fuel mixture using an offset counterbore valve or the like to insure that a fresh mixture of air-fuel is introduced into the area near the spark plug during the intake stroke and to avoid dispersion and dilution of the entering air-fuel mixture.

It should be further noted and understood that our invention is not limited to spark ignition engines or to engines utilizing carburetors to form an air-fuel mixture. The invention is equally applicable to diesel engines and to engines with fuel injection systems. In the latter case, the air-fuel mixture would be formed in the cylinder with the intake valve system described controlling only the admission of air. The fuel injection might be coordinated with the opening and closing of the auxiliary intake timing valve 32, or, if injection was into the intake manifold, it could be continuous. For intermittent injection, the fuel injector would preferably be near the intake port or in the cylinder and aimed to direct the fuel so as to mix with the stream of incoming air or with the already introduced air if injection occurs during the compression strokes. An injector placed concentrically within the main intake valve 31 would be very satisfactory.

Our invention is not limited to the particular novel valve assembly shown in the drawings for exemplification. Other types of valves might also be used in series, such as rotary barrel valves, rotary vane valves, reciprocating vane valves and others. However, the design shown in FIGS. 9–11 is particularly suitable because there is a zero volume between the main and auxiliary valves. As stated hereinbefore, this is very important because it results in a zero increase in the overall combustion chamber volume when the main valves are opened and, therefore with regard to the intake valve assemblies, it prevents products of combustion from coming into the volume between the main and auxiliary valves and which would dilute the incoming air-fuel mixture.

Ordinarily, in a conventional engine the fuel is not completely vaporized in the intake port and a film of fuel builds up on the wall of the intake port. Because the basic method of controlling intake is by varying the pressure in the intake port, the thickness of the fuel film varies substantially and, unless compensated for, significant variations in the content of the air-fuel mixture momentarily reaching the cylinder result. As shown in FIGS. 1–5, our basic method of intake control is not by throttling the mixture, but by varying the proportions of products of combustion and fuel-air mixture. Thus, in our invention, the pressure in the intake port does not decrease significantly with load, whereby we obtain better fuel utilization and a decrease in exhaust emissions.

While we show intake and exhaust valve assemblies each comprising a main valve which functions in the conventional manner and a light auxiliary timing valve for changing the phases of the intake and exhaust cycles in response to accelerator position, it is understood that our method may be practiced by providing variable timing mechanism for a single intake valve of conventional construction and a single exhaust valve of conventional construction wherein the variable timing mechanism is responsive to variations in accelerator position.

Figure 12:
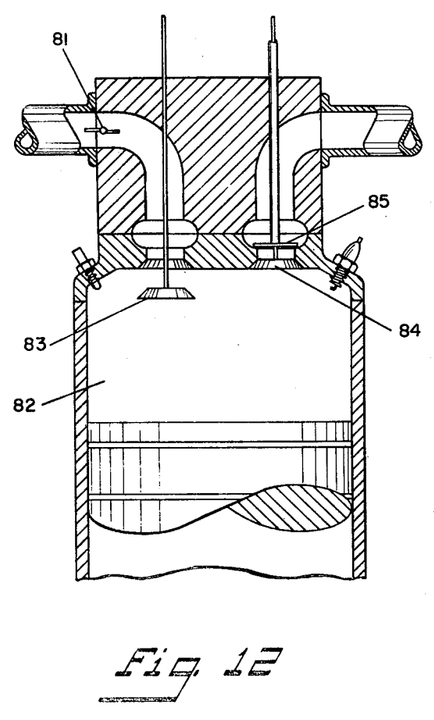
FIG. 12 is a schematic sectional view showing a modified exhaust valve arrangement for a four-stroke cycle engine.

Another form of exhaust gas control is illustrated in FIG. 12 where an oscillating butterfly valve 81 is utilized to create a back-pressure in the cylinder 82 during the exhaust stroke whereby a desired amount of the exhaust gases is retained in the cylinder in inverse proportion to the engine load desired. In this form, the main exhaust valve 83 and main intake valve 84 would be timed in the conventional manner as in the embodiment shown in FIGS. 1–5, and the auxiliary intake timing valve 85 is timed in the same manner as auxiliary valve 32 shown in FIGS. 1–5 by phase control mechanism such as shown in FIGS. 6–8. The amount of the exhaust gases retained in the cylinder is controlled by the setting of the butterfly valve 81 which is controlled directly by the position of accelerator 68 through conventional linkage. When the accelerator is completely depressed the butterfly valve 81 would be full open so no exhaust gases in addition to the normal clearance gases are retained to permit intake of a maximum charge of air-fuel mixture for operating the engine at full load. When the accelerator is only partially depressed the butterfly valve 81 is partially closed whereby a portion of the exhaust gases in addition to the normal clearance gases is retained in the cylinder for operating the engine at partial load. The quantity of air-fuel mixture taken in will be cut down accordingly by the auxiliary intake valve 85 to provide a stratified charge for partial loads.

Figure 13:
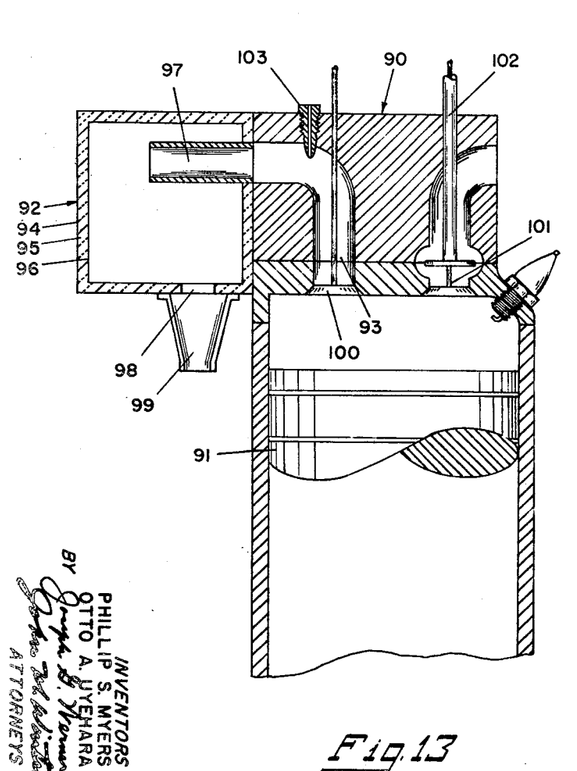
FIG. 13 is a sectional schematic view of a four-stroke cycle engine with an insulated plenum chamber illustrating a method and apparatus embodying our invention.

FIG. 13 illustrates another four-stroke cycle engine 90 embodying our invention. The basic difference between this embodiment and the one just described is that in this one, the products of combustion are substantially all exhausted from the cylinder 91 during the exhaust stroke and the last portion thereof is returned to the cylinder during the first part of the intake stroke. An exhaust gas chamber 92 is provided for the purpose of isolating a portion of the exhaust gases leaving the cylinder 91 through exhaust port 93 during each cycle. The exhaust gas chamber 92 is preferably constructed with a rigid outer shell 94, a layer of insulating material 95 and, a rigid inner shell 96. The exhaust gas chamber 92 is attached to the engine so that it communicates with the exhaust port 93 of the cylinder 91. Exhaust port extension 97 aligns with the exhaust port 93 and forms a continuous conduit into chamber 92.

An exhaust outlet 98 is provided in the insulated chamber 92 and may be positioned at the bottom as shown. This outlet 98 provides a passage from the exhaust gas chamber 92 to a conventional exhaust manifold 99.

The operation of that embodiment of our invention shown in FIG. 13 incorporating the scheme of returning exhausted products of combustion to the cylinder requires that the main exhaust valve 100 operate on a different cycle than in present engines. It must remain open for some time during the intake stroke for readmitting the exhausted products of combustion. Since the amount of exhaust gas readmitted must be variable with accelerator position control, means such as shown in FIGS. 6–8 may be provided to time the closing of the exhaust port 93. This timing function may be obtained by controlling the timing of main exhaust valve 100 or, as in the previous illustrations, the closing of exhaust port 93 can be accomplished by an auxiliary exhaust timing valve. In the latter case, the action of the main exhaust valve 100 would preferably be designed for minimum load conditions with the initial closing of the port 93 under all other load conditions effected by the auxiliary exhaust timing valve. The action of intake valves 101 and 102 would be the same as hereinbefore described for intake valves 31 and 32.

The insulated exhaust gas chamber 92 will aid in the further combustion of exhaust gases by keeping them at or near reaction temperatures. This not only facilitates further combustion in the cylinder, but also tends to further reduce unburned or partially burned fuel and oxides of nitrogen in the exhaust gases before they pass into the exhaust manifold 99.

In addition to the exhaust gas chamber described, an air injector 103 may be provided for injecting into the reentering products of combustion to enhance the oxidation reduction of the unburned fuel constituents therein. Air injection 103 is coordinated with the timing of the main exhaust valve 100, or with a lighter auxiliary exhaust timing valve if one is utilized.

(b) Two-stroke cycle engine

Figure 14:
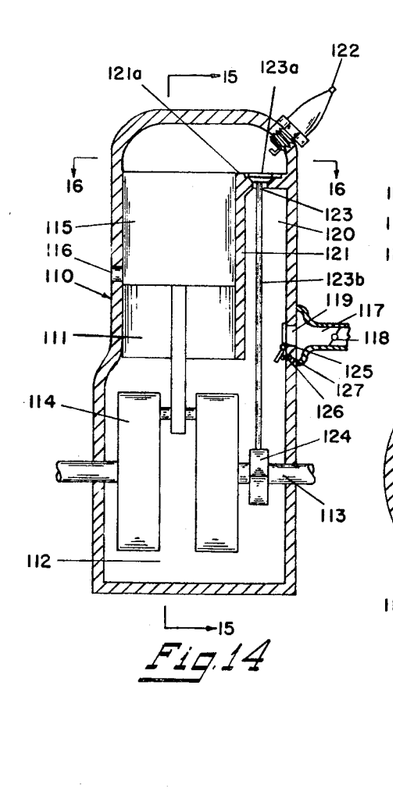
FIG. 14 is a schematic sectional view of a two-stroke cycle engine illustrating a method and apparatus embodying our invention.
Figure 15:
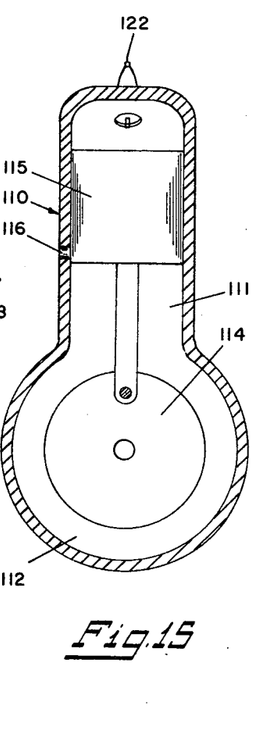
FIG. 15 is a sectional view taken along section line 15—15 of FIG. 14.
Figure 16:
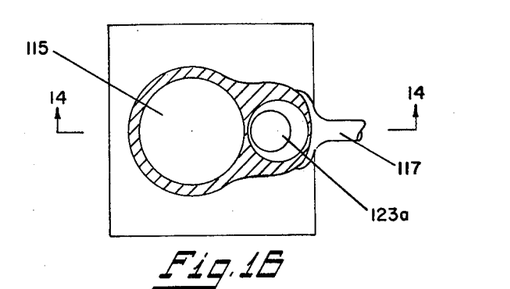
FIG. 16 is a sectional view taken along section line 16—16 of FIG. 14.

Our invention, as applied to a two-stroke cycle engine, is shown in FIGS. 14–20. FIGS. 14 and 15 show partial cutaway elevational views taken at right angles to each other of a single-cylinder, spark-ignition, two-stroke cycle engine.

The two-cycle engine 110 embodying our invention comprises a cylinder 111, a crankcase 112, crankshaft 113, crank throws 114 and piston 115. An exhaust port 116 is provided in the cylinder wall at a point where it will be opened when the piston 115 is near the bottom of its stroke so that a portion of the products of combustion will be forced out of the cylinder 111 by the pressure remaining from combustion. Engine 110 has an intake manifold 117 having a throttling valve 118 therein. The intake manifold communicates with an intake port 119 in the wall of the cylinder which in turn communicates through a check valve 125 with the crankcase 112. An air-fuel transfer passage 120 formed by wall portion 121 connects the crankcase 112 with the top portion of the cylinder 111 adjacent to the spark plug 122. The top of wall portion 121 provides a valve seat 121a or the head portion 123a of a poppet valve 123. The stem 123b of valve 123 extends through passage 120 to a point adjacent to crankshaft 113 where it is actuated by a cam 124 mounted on the crankshaft 113.

The intake check valve 125 is provided to seal the intake port 119 during the downward movement of the piston during the power stroke. The intake check valve 125 shown in FIG. 14 is a single pivoting flapper-type valve, normally held closed by a small spring 126 positioned in a recess 127 below the intake port 119. The check valve 125 is designed to open as soon as the pressure within crankcase 112 drops below atmospheric. The particular valve 125 is shown for exemplification and it is understood that other pressure responsive or mechanically actuated valves could be employed.

Figure 17:
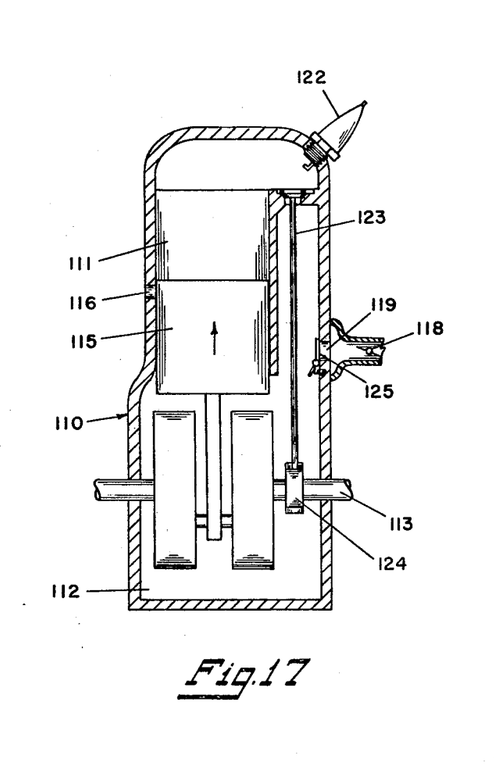

The operation of our new two-cycle engine is illustrated sequentially in FIGS. 17–20. In FIG. 17 the piston 115 is shown during the first portion of its upward travel. It has sealed the port 116 and is compressing a stratified charge made up of products of combustion and air-fuel mixture. At this point of piston travel both the intake poppet valve 123 and the intake check valve 125 are closed, but the pressure in the crankcase 112 is dropping at this point with the upward movement of the piston thereby causing a pressure differential across the intake check valve 125.

Figure 19:
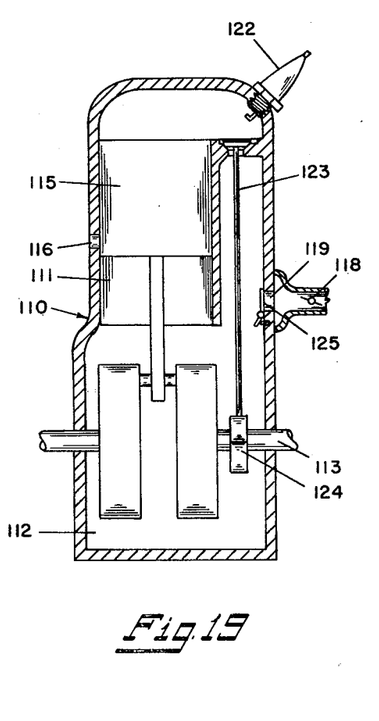

The continued upward movement of the piston 115 as shown in FIG. 18 causes the intake check valve 125 to open, admitting fresh air-fuel mixture into the crankcase 112. The air-fuel mixture is drawn into the crankcase by the partial vacuum created therein during the upward movement of the piston. When the piston is at the top of its stroke as shown in FIG. 19, the stratified charge in the cylinder is fully compressed and ready for ignition and the crankcase is filled with air-fuel mixture.

Figure 20:
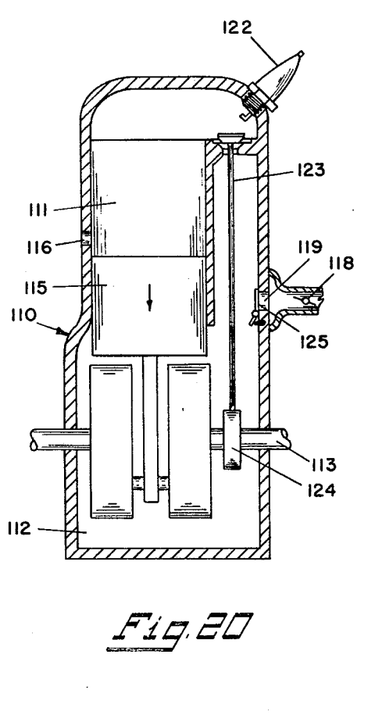

Upon ignition, the piston begins its downward movement. As the downward movement of the piston continues and the piston nears the bottom of its stroke as shown in FIG. 20, the exhaust port 116 is exposed by the piston motion and the poppet intake valve is opened by the cam 124 on crankshaft 113. As the pressure within the cylinder is relieved by the downward movement of the piston and by the exhausting of the products of combustion from the cylinder, the pressure in the crankcase forces the air-fuel mixture upwardly through passage 120 and into the cylinder. As the air-fuel mixture enters the cylinder it scavenges the area around the spark plug 122 especially if an offset counterbore valve is used as shown in FIGS. 14–20, and forms a layer above the products of combustion from the preceding explosion which remain in the bottom portion of the cylinder immediately above the piston. The top portion of the stratified cylinder charge, that is, that portion of the total cylinder charge enveloping the spark plug, is always a fresh mixture of air and fuel. The "trapped" products of combustion in each cycle are those from the quench zone at the top portion of the cylinder and are, accordingly, rich in unburned fuel. The cylinder is thus filled with a stratified charge for the beginning of the next cycle. If desired, an auxiliary valve could be introduced at or beyond the exhaust port. This auxiliary valve could control the exhaust outflow and thus the quantity of exhaust gases trapped in the cylinder.

The quantity of air-fuel mixture drawn into the crankcase 112 and consequently the pressure in the crankcase when the piston is at the top of its stroke is controlled by the throttle valve 118 in the intake manifold 117. The output of the engine is determined by the throttling valve 118. It will determine the quantity of air-fuel mixture drawn into the crankcase and the quantity of air-fuel mixture forced into the cylinder and thus the amount of the products of combustion retained in the cylinder for recombustion.

Since complete scavenging of the cylinder at less than full engine load, as takes place in present two-cycle engines, is not intended and is in fact prevented, increased fuel economy in the engine at partial load will result since little, if any, of the unburned fuel and oxides of nitrogen will go out the exhaust port during the scavenging process. The retention of the unburned portion of the products of combustion and oxides of nitrogen in the cylinder for the next cycle is, of course, also very desirable from an emission standpoint. It is intended that spark timing will be nearly constant with load and varied merely to obtain optimum performance and not as a means of load control as in conventional two-cycle engines.

The foregoing description is merely illustrative of our new method as embodied in two-cycle engines and is not intended to restrict our invention to the particular embodiment shown in the drawings and described herein. Any number of known valves can be used to control the intake function and auxiliary timing valves can be utilized as described above in connection with four-cycle engines to variably time the intake of air-fuel mixture. In addition, the auxiliary exhaust port valve which can be used to control the quantity of exhaust gases remaining in the cylinder as previously mentioned and thus the quantity of fresh mixture introduced and consequently the load will also be controlled by that valve.

The two-cycle engine herein described can also be adapted for fuel injection, with the intake function described being limited to air. The basic concept remains however, to obtain a stratified charge of products of combustion and air-fuel mixture at reduced engine loads.

(c) Rotary engine

One method of increasing combustion efficiency and reducing air pollution at partial engine loads is applicable to all types of internal combustion engines, including rotary piston engines such as the Wankel engine, described in U.S. Patent No. 2,988,065, issued June 13, 1961. In our improved internal combustion engine of the rotary type shown in FIGS. 21–24, the last portion of the products of combustion leaving the exhaust chamber is diverted into the intake port and passes into the adjacent intake chamber for recombustion.

Figure 21:
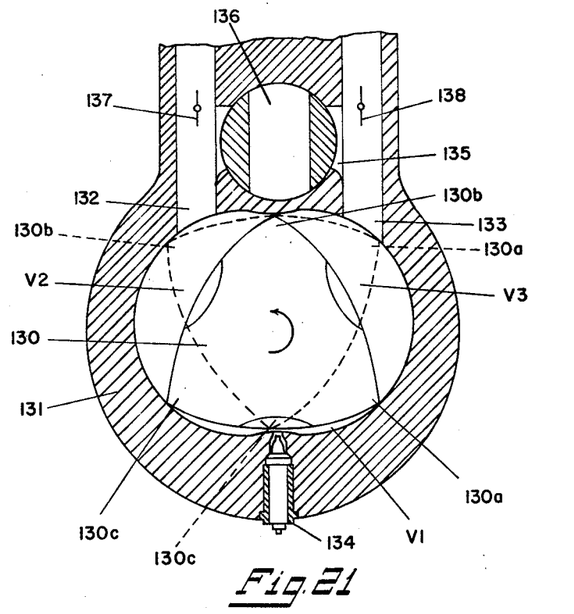
FIGS. 21–23 are schematic sectional views showing the operation of a rotary internal combustion engine illustrating a method and apparatus embodying our invention.

As shown in FIG. 21, typically, a rotary engine has a generally triangular rotor 130, mounted for counterclockwise rotation in a two-lobed epitrochoidal casing 131, an intake port 132, an exhaust port 133 and a spark plug 134. While this clearly is not an exhaustive description of a rotary engine, it is sufficient for a concise explanation of our improved version for achieving increased combustion efficiency. A complete and detailed description of rotary engines appears in the above mentioned patent to Wankel.

Figure 22:
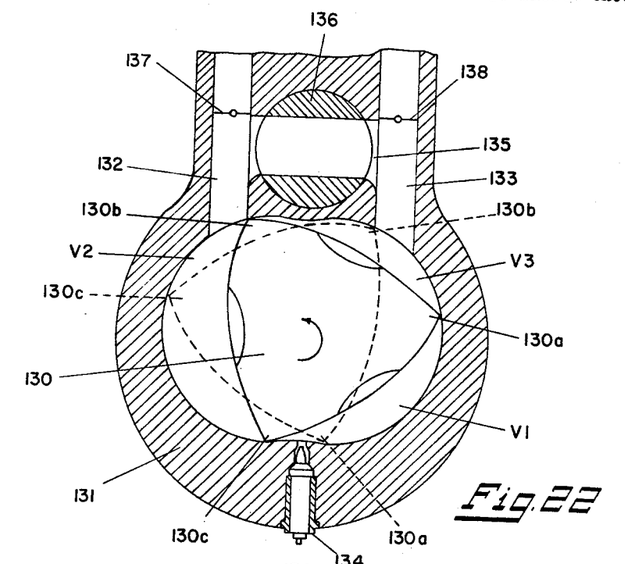
Figure 23:
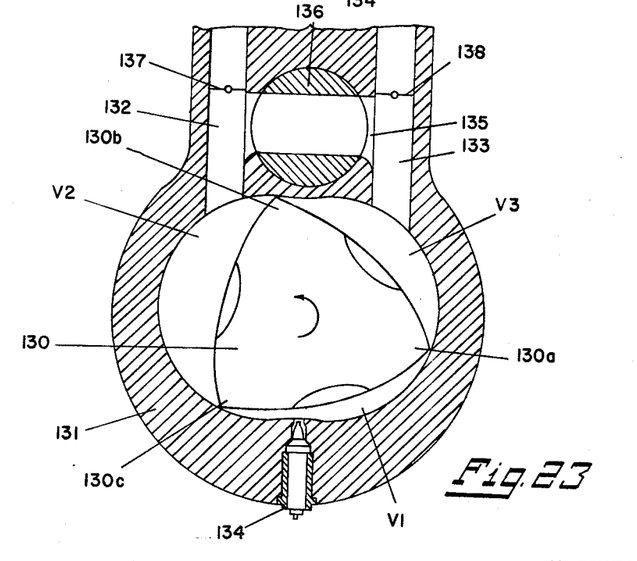

The general functioning of our improved rotary engine can best be understood by referring to FIGS. 21–23 showing various rotor positions during engine operation. The engine has three chambers described by the three sides of the rotor 130 and the corresponding subtended arcs of the casing 131. These chambers are designated as $V_1$, $V_2$, and $V_3$ in the drawings. In FIG. 21 chamber $V_1$ is the combustion chamber wherein a compressed air-fuel mixture is approximately at the point of ignition. In chamber $V_3$, products of combustion are being exhausted out of the exhaust port 133. The exhaust process will continue in chamber $V_3$ until the apex 130a of the rotor 130 travels beyond the exhaust port 133. A fresh air-fuel mixture is being drawn into intake chamber $V_2$ and will be sealed therein when apex 130b slides past the intake port 132.

In order to divert a portion of the products of combustion from the exhaust chamber $V_3$ into the intake chamber $V_2$ we provide an interconnecting channel 135 between the exhaust port 133 and the intake port 132 and various valves for opening and closing channel 135 and intake and exhaust ports 132 and 133.

In the valve arrangement as shown in the drawings for exemplification, rotary barrel valve 136 is provided in the interconnecting channel 135 to open and close it as desired and butterfly valves 137 and 138, either oscillating or rotating, are provided in the intake port 132 and the exhaust port 133, respectively.

At full load, intake and exhaust butterfly valves 137 and 138 would be fully opened and the rotary barrel valve 136 would be closed as shown in FIG. 21, whereby the engine operates in the normal manner. The valves would remain in these positions until the engine load decreases and it becomes desirable to stratify the charge.

To facilitate explanation of our invention, assume that the engine shown in the drawings is operating at partial load and it is therefore desirable to obtain a stratified charge of products of combustion and air-fuel mixture in the combustion chamber of the engine.

In FIG. 21, the rotor 130 (shown in full lines) is in a position in which ignition is taking place in chamber $V_1$, while intake is taking place in chamber $V_2$ and exhaust is taking place in chamber $V_3$. The power stroke for chamber $V_1$ continues until the chamber $V_1$ is opened to exhaust port 133 as apex 130a of rotor 130 reaches exhaust port 133 as shown in broken lines in FIG. 21.

Referring now to FIG. 22, the intake and exhaust butterfly valves 137 and 138 are closed and rotary valve 136 is opened sometime after rotor apex 130b opens volume $V_3$ to exhaust port 133, as shown in broken lines in FIG. 22, and before chamber $V_2$ attains is maximum volume, approximately as shown in full lines in FIG. 22.

The exact point in the rotation of rotor 130 at which the valves 137 and 138 close and valve 136 opens depends on the accelerator position; the valves 137 and 138 closing earlier and valve 136 opening earlier for lighter engine loads, and later as the engine approaches full load.

For purposes of illustration assume that the accelerator position is such that valves 137 and 138 close and valve 136 opens when the rotor 130 is in the position shown in FIG. 23. The intake of air-fuel mixture through the intake port 132 is thus cut off by intake valve 137 before chamber $V_2$ attains its maximum volume. At the same time that intake butterfly valve 137 closes cutting off the air-fuel mixture intake, exhaust butterfly valve 138 closes and rotary valve 136 opens as shown in FIG. 23 thereby passing the remaining products of combustion in volumetrically decreasing chamber $V_3$ through connecting port 135 and valve 136 into volumetrically increasing chamber $V_2$ to form a stratified charge comprising air-fuel mixture and products of combustion.

While for purposes of illustration we have shown the intake and exhaust butterfly valves 137 and 138 closing and rotary connecting valve 136 opening when the rotor 130 is in the position shown in FIG. 23 these valves may be actuated at any time between the rotor positions shown in FIG. 22 depending on the engine load. The amount of products of combustion transferred from the exhaust chamber $V_3$ to the intake chamber $V_2$ is controlled by varying the closing of intake and exhaust butterfly valves 137 and 138 and the concurrent opening of rotary connecting valve 136. Where a smaller amount of air-fuel mixture is necessary and a greater quantity of products of combustion are desired in the stratified charge for relatively light engine loads, the closing of the valves 137 and 138 and the opening of valve 136 take place earlier than where a relatively greater amount of air-fuel mixture is required and a lesser amount of products of combustion is desired for the stratified charge for heavier engine loads.

The timing of valves 136, 137 and 138 may be variably controlled in accordance with accelerator position by phase control mechanism such as shown in FIGS. 6–8 and described hereinbefore in connection with our four-stroke cycle engine.

The particular construction and arrangement of valves shown in this embodiment are not intended as exclusive, but rather represent a simple and economical application of our invention to the rotary engine.

It is understood that the foregoing description of our invention as embodied in several types of internal combustion engines is intended to present a concise understanding of our invention, and that our invention is not confined to particular examples herein illustrated and described, but embraces all such modified forms thereof as come within the scope of the following claims.

We claim:
1. Apparatus in an internal combustion engine for controlling flow through a port communicating with a combustion chamber, said apparatus comprising:
   (a) a main valve control means and an auxiliary valve control means operated out of phase with said main valve control means at partial engine loads,
   (b) a main sealing valve in the port and having a sealing head moved by said main valve control means between an open and a closed position, and
   (c) an auxiliary variable timing valve in the port in series with said main sealing valve,

(1) said auxiliary variable timing valve having an open-ended tubular head moved by said auxiliary valve control means from an open position to a closed position during the time when said main sealing valve is in its said open position during each engine cycle when the engine is operating at partial load, (2) the head of said auxiliary variable timing valve in its closed position sealing against the wall of the port and against the head of said main sealing valve to cut off flow through the port when said main sealing valve is in its open position, and (3) the head of said main sealing valve when it is closed shielding said auxiliary variable timing valve from said combustion chamber.

2. The improved valve assembly as specified in claim 1 wherein the open-ended tubular head of said auxiliary variable timing valve is of such a length that it remains in sliding sealing engagement with the wall of the port in both its open and closed positions.

3. The improved valve assembly as specified in claim 1 wherein the open-ended tubular head of said auxiliary variable timing valve is supported from a stem by spaced connecting members, said spaced connecting members permitting flow therebetween through said tubular head.

4. The improved valve assembly as specified in claim 1 wherein there is zero volume between the main sealing valve and the auxiliary variable timing valve when the auxiliary variable timing valve is closed.

References Cited

UNITED STATES PATENTS

| 1,494,763 | 5/1924 | West. | |
| 1,542,476 | 6/1925 | Sargent. | |
| 1,657,108 | 1/1928 | Clemens. | |
| 1,819,743 | 8/1931 | Duncan. | |
| 794,859 | 7/1905 | Gosse | 123—109 |
| 3,237,615 | 3/1966 | Daigh. | |
| 3,359,958 | 12/1967 | Von Seggern | 123—119 X |

WENDELL E. BURNS, Primary Examiner

U.S. Cl. X.R.

123—79, 90, 100, 109, 110, 119, 188